United States Patent
McGuire, Jr. et al.

(10) Patent No.: US 12,065,549 B2
(45) Date of Patent: Aug. 20, 2024

(54) POLYMERIC SHEET USEFUL FOR APPLICATION TO CONCAVE SURFACE TOPOGRAPHIES OF ARTICLES AND RELATED METHODS

(71) Applicant: PPG Advanced Surface Technologies, LLC, Columbus, OH (US)

(72) Inventors: James E. McGuire, Jr., Palm Beach, FL (US); Matthew J. Canan, Hilliard, OH (US)

(73) Assignee: PPG Advanced Surface Technologies, LLC, Columbus, OH (US)

( * ) Notice: Subject to any disclaimer, the term of this patent is extended or adjusted under 35 U.S.C. 154(b) by 550 days.

(21) Appl. No.: 17/291,581

(22) PCT Filed: Nov. 21, 2019

(86) PCT No.: PCT/US2019/062694
§ 371 (c)(1),
(2) Date: May 5, 2021

(87) PCT Pub. No.: WO2020/107001
PCT Pub. Date: May 28, 2020

(65) Prior Publication Data
US 2022/0010083 A1    Jan. 13, 2022

Related U.S. Application Data

(60) Provisional application No. 62/770,273, filed on Nov. 21, 2018.

(51) Int. Cl.
*C08J 5/18*     (2006.01)
*C09J 7/25*     (2018.01)

(52) U.S. Cl.
CPC . *C08J 5/18* (2013.01); *C09J 7/25* (2018.01); *C08J 2375/04* (2013.01); *C09J 2475/006* (2013.01)

(58) Field of Classification Search
CPC ... C08J 5/18; C08J 2375/04; C09J 7/25; C09J 2475/006
(Continued)

(56) References Cited

U.S. PATENT DOCUMENTS

| | | | |
|---|---|---|---|
| 4,574,147 A | 3/1986 | Meckel | |
| 4,830,918 A | 5/1989 | Schinkel et al. | |

(Continued)

FOREIGN PATENT DOCUMENTS

| | | |
|---|---|---|
| CA | 1318075 | 5/1993 |
| CN | 101522417 | 9/2009 |

(Continued)

OTHER PUBLICATIONS

Office Action Issued in Japanese Appln No. 2021-528375, dated Jul. 4, 2023, 10 pages.
(Continued)

*Primary Examiner* — James D Sells

(57) ABSTRACT

Polymeric sheets of the invention comprise sequential layers as follows: a topcoat layer, a polyurethane-based carrier layer, and an adhesive layer. The polyurethane-based carrier layer is formed using essentially no chain extender having a molecular weight of 350 grams/mole or less, resulting in a relatively low storage modulus polymeric sheet. Such polymeric sheets are particularly useful for application to surfaces having a concave topography.

18 Claims, 3 Drawing Sheets

(58) Field of Classification Search
USPC .......................................................... 156/229
See application file for complete search history.

(56) References Cited

U.S. PATENT DOCUMENTS

| | | |
|---|---|---|
| 5,679,418 A | 10/1997 | Akasawa |
| 6,660,825 B1 | 12/2003 | Endo |
| 8,128,779 B2 | 3/2012 | Ho et al. |
| 8,551,285 B2 | 10/2013 | Ho et al. |
| 9,790,318 B2 | 10/2017 | McGuire, Jr. et al. |
| 9,933,550 B2 | 4/2018 | Hosokawa et al. |
| 2017/0218226 A1 | 8/2017 | Ho et al. |
| 2018/0362809 A1* | 12/2018 | Xie .............................. C09J 7/29 |

FOREIGN PATENT DOCUMENTS

| | | |
|---|---|---|
| EP | 2818488 | 12/2014 |
| JP | 2003191403 A | 7/2003 |
| JP | 2010255163 A | 11/2010 |
| JP | 2017109431 A | 6/2017 |
| JP | 2017525803 A | 9/2017 |
| WO | WO-2008/042883 | 4/2008 |
| WO | WO-2014/195211 | 12/2014 |
| WO | 2017156507 A1 | 9/2017 |
| WO | WO-2018/057379 | 3/2018 |

OTHER PUBLICATIONS

"Capa(TM) 3050 by Perstorp—Adhesives & Sealants," XP55927197 [retrieved from the Internet on Jun. 1, 2022 <https://www.ulprospector.com/en/na/Adhesives/Detail/25759/571142/Capa-3050>].

* cited by examiner

POLYMERIC SHEET USEFUL FOR APPLICATION TO CONCAVE SURFACE TOPOGRAPHIES OF ARTICLES AND RELATED METHODS

CROSS-REFERENCE TO RELATED APPLICATIONS

This application claims the benefit of U.S. Provisional Patent Application No. 62/770,273, filed on Nov. 21, 2018, which is incorporated herein by reference in its entirety.

BACKGROUND OF THE INVENTION

Polymeric film is useful in a range of indoor and outdoor applications in, for example, the transportation, architectural and sporting goods industries. Polymeric films or laminates comprising the same can advantageously be applied to at least a portion of a surface of any article where protection or decoration (e.g., with paint) is desired. Such articles include, for example, motorized vehicles and non-motorized vehicles amongst a multitude of other applications.

Surfaces on which polymeric films or laminates comprising the same are used can be, for example, painted or unpainted. When a polymeric film or laminate comprising the same is pigmented or otherwise, it can be used itself as "paint in film form" (also referred to as a "paint film applique," "paint replacement film," "paint film," or the like). When a polymeric film or laminate comprising the same is adhered to a surface primarily for the purpose of protecting paint existing on the underlying surface, it is often referred to as a "paint protection film" or the like.

Often polymeric film or laminate comprising the same takes the form of a multi-layer polymeric sheet—i.e., one which includes an outwardly exposed adhesive layer for adherence of the polymeric film to a surface of an article. However, adhesion of such polymeric sheets to surfaces having concave topographies is often not adequate. Even if a polymeric sheet is capable of conforming to a complex surface topography, such as a concave surface topography, initially, conventional polymeric sheets are generally prone to undesired lift or separation from such a surface over time.

Energy stored in the polymeric sheet after stretching the same to conform to a complex surface topography is believed to be a force driving return of the polymeric sheet to its normal shape. When material comprising the polymeric sheet has a relatively high storage modulus, the driving force is believed to be relatively high as well. That force is often high enough to overcome the force of adhesion of the polymeric sheet to the underlying surface, causing the undesired lift or separation.

Polyurethanes are known to be useful polymeric films for use in the above-described articles. Polyurethane is typically formed from a relatively long-chain polyol and a relatively short-chain polyol (i.e., chain extender). As compared to those having a relatively high storage modulus, formulating and processing polyurethanes having a relative low storage modulus—i.e., "soft" polyurethanes—can be difficult. For example, PCT Patent Publication No. WO 2014/195211A1, entitled "Soft Thermoplastic Polyurethane Elastomers and Process for Their Preparation," describes how low levels of chain extender used to form soft polyurethanes can result in unacceptable characteristics and unprocessable materials.

Thermoplastic polyurethanes (TPUs) are typically formulated from at least one polyol (usually polyester polyol and/or polyether polyol), at least one polyisocyanate (usually an organic diisocyanate), and at least one chain extender. Hardness/softness of a TPU is largely determined by the ratio of hard segment (formed by reaction of the chain extender with the diisocyanate groups of the polyisocyanate) to soft segment (formed by reaction of the polyol with the diisocyanate groups of the polyisocyanate). In order to make thermoformable polyurethane, high molecular weight macrodiols are often needed. When forming a softer TPU, if the amount of hard segment is reduced so that hardness of the TPU is below a value of 80 Shore A, the resulting products are usually tacky, solidify poorly, exhibit poor releasability from the mold during injection mold processing, and exhibit severe shrinkage. Thus, no economically acceptable injection molding cycle times are ensured with use of softer TPU according to conventional technology.

As such, methods and apparatus for improved application of polymeric film and laminates comprising the same to surfaces of an article, particularly those portions of the surface having a concave topography, are desired.

SUMMARY OF THE INVENTION

Improved polymeric sheets of the invention comprise sequential layers as follows: a topcoat layer, a polyurethane-based carrier layer, and an adhesive layer. One or more additional layers, as appropriate and desired, may be included within this sequence of layers. For example, in one embodiment, a color layer is provided adjacent to the polyurethane-based carrier layer, either on a side of the carrier layer opposite the topcoat layer or a side of the carrier layer opposite the adhesive layer.

Advantageously, the polyurethane-based carrier layer is formed using essentially no chain extender having a molecular weight of 350 grams/mole or less. By use of such a carrier layer, a relatively low storage modulus polymeric sheet is effectively obtained. Such polymeric sheets are particularly useful for application to surfaces having a concave topography.

DETAILED DESCRIPTION OF THE INVENTION

Figure 1:
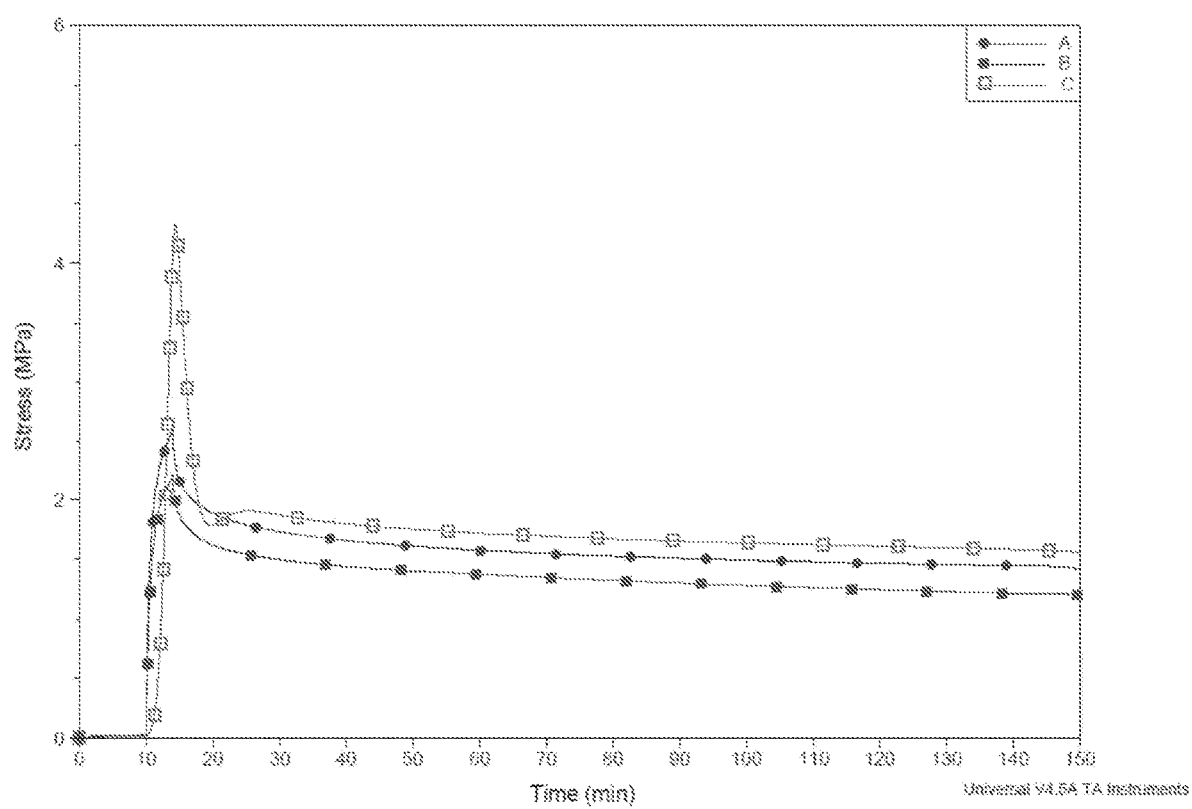
FIG. 1 is a graph of stress versus time for Comparative Example C and Examples A-B when tested according to the Stress-Time (Relaxation) Test Method described herein.

Conventional polymeric sheets often include relatively stiff layers and an overall construction for the purpose of protecting and/or otherwise covering an underlying surface to which they are adhesively applied. The polymeric sheet may protect paint existing on the underlying surface in some embodiments, for example, or the polymeric sheet may itself provide aesthetic qualities comparable to paint in other embodiments.

Relatively stiff layers often result by, for example, formation of the layer using extrusion processing techniques. Extrusion-formed layers are generally formed from material having a relatively high storage modulus (i.e., relatively high Young's modulus). Recovery of such a material is generally expedited upon heating of the same above room temperature. As a result, dimensions of such a layer often shrink with respect to an underlying surface when heat is applied. When the underlying surface has a concave topography, that shrinkage can translate into lift of an adhesive-backed polymeric sheet comprising the same from the surface.

In a polymeric sheet according to the invention, a carrier layer is interposed between an adhesive layer and a topcoat layer. In a preferred embodiment, the carrier layer is polyurethane-based, preferably polyurethane. Material comprising the carrier layer according to exemplary embodiments has a relatively low storage modulus (i.e., relatively low Young's modulus).

To effect a relatively low storage modulus, the amount of chain extender, especially chain extender understood to have a molecular weight of 350 grams/mole or less, used in formation of a polyurethane-based carrier layer is minimized according to the invention. In a preferred embodiment, no chain extender having a molecular weight of 350 grams/mole or less is used in formation of a polyurethane-based carrier layer of the invention. For example, butane diol, which is a commonly used chain extender, is not used in formation of such a carrier layer. The absence of chain extenders can be confirmed by analysis of the resulting carrier layer using any suitable method of analysis, such as nuclear magnetic resonance (NMR).

In addition, use of relatively high molecular weight macrodiols typically used to make thermoformable polyurethane is minimized according to the invention. In one embodiment, no polyols having a molecular weight of 1,000 grams/mole or greater are used in formation of a polyurethane-based carrier layer of the invention. According to a further embodiment, polyols used in formation of a polyurethane-based carrier layer of the invention have a molecular weight between about 350 grams/mole and about 1,000 grams/mole. According to yet another embodiment, polyols used in formation of a polyurethane-based carrier layer of the invention have a molecular weight between about 350 grams/mole and about 450 grams/mole. An example of such a polyol is a polyester diol sold under the trade designation, CAPA 2043, and available from Ingevity (North Charleston, SC). In a preferred embodiment, essentially the only polyol used in formation of a polyurethane-based carrier layer of the invention is such a diol.

Use of triols in formation of a polyurethane-based carrier layer is minimized according to the invention. Preferably, less than about 10% by weight, based on total weight of polyol components, have more than two hydroxyl moieties (e.g., triols). An example of a polyol that can be used within these limitations is a polyester triol sold under the trade designation, CAPA 3091, and available from Ingevity (North Charleston, SC).

Due to the nature of the polymerizable composition used to form the polyurethane-based carrier layer of the invention, a polymeric sheet comprising the same advantageously has a lower storage modulus. The nature of the polymerizable composition can be confirmed by analysis of the resulting carrier layer using any suitable method of analysis, such as nuclear magnetic resonance (NMR).

Any suitable material can be used for the topcoat layer. In a preferred embodiment, the topcoat layer exhibits a relatively high elongation before break. Material comprising the topcoat layer according to exemplary embodiments has a relatively low storage modulus (i.e., relatively low storage modulus) much as the carrier layer. Until application of the polymeric sheet to a surface, the topcoat layer may be covered with a carrier film.

Any suitable material can also be used for the adhesive layer as known to those of ordinary skill in the art. In an exemplary embodiment, the adhesive layer comprises a pressure sensitive adhesive. Until application to a surface, the adhesive layer of the polymeric sheet may be covered by a protective release film.

When constructed according to the invention, polymeric sheets have a stiffness that is significantly lower than that of conventional polymeric sheets, such as those formed using extrusion-coated polyurethane-based carrier layers, making them very useful in application of the same to surfaces of articles that are concave.

EXAMPLES

Stress-Time (Relaxation) Test Method

Figure 2:
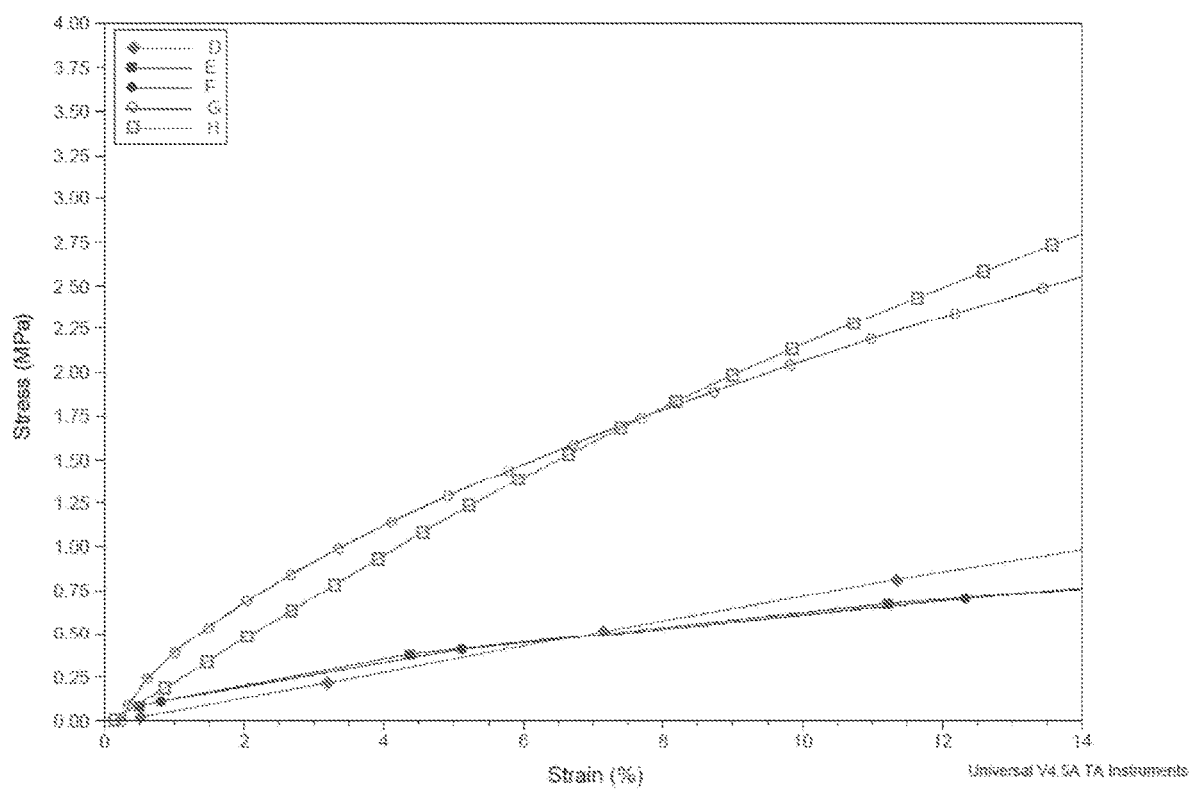
FIG. 2 is graph of stress versus strain for Comparative Example C and Examples A-B when tested according to the Stress-Strain Test Method described herein.

A dynamic mechanical analyzer available from TA Instruments (New Castle, DE) under the trade designation TA Instruments DMA Q800 is used to perform this test in tension mode. Nominal sample sizes having a length of 5-12 mm, a width of 4-8 mm, and a thickness of 0.02-0.2 mm were used. Each sample was stretched to 40% strain and held at 40% strain. Starting at ten minutes after reaching 40% strain, the force to maintain that strain was recorded, as illustrated in FIG. 2. Due to the isothermal hold, the force shown at ten minutes is that occurring twenty minutes after stretching the sample to 40% strain and the like throughout the time period illustrated in FIG. 1.

Stress-Strain Test Method

A dynamic mechanical analyzer available from TA Instruments (New Castle, DE) under the trade designation TA Instruments DMA Q800 is used to perform this test in tension mode. Nominal sample sizes having a length of 5-12 mm, a width of 4-8 mm, and a thickness of 0.02-0.2 mm were used. Stress on the sample being tested was ramped up at a rate of 18 MPa/min to a value of 50 MPa, at which time strain on the sample was recorded, as illustrated in FIG. 2.

Bent Panel Stretch Test Method

Each sample was pre-stretched at room temperature to about one-hundred, twenty percent (120%) of its initial length, after which time the polymeric sheet was adhered to a test panel with a concave surface topography. The test panel was formed by bending a panel having a length of about 15.2-centimeters and a width of about 7.6-centimeters into the shape illustrated in FIG. 3. The bent panel, thus formed, had two ends, each measuring about 5.1-centimeters in length on parallel planes, with a connecting portion. The connecting portion was formed by bending the panel at an angle of about 60-degrees proximate each end to form a bend having a radius of about 1.3-centimeters at each bend location. If the sample remained substantially adhered to the test panel thus formed for twenty-four hours, it was considered to "pass" the test. If the sample lifted from the test panel, it was considered to "fail" the test. Results were determined after maintaining the sample and test panel at both room temperature and 80° C.

Comparative Example C

A polymeric sheet was formed with sequential layers as follows: an acrylic pressure sensitive adhesive layer (25.4-microns thick), color layer (25.4-microns thick), extruded polyurethane layer (76.2-microns thick), and topcoat layer (10.2-microns thick). The acrylic pressure sensitive adhesive layer was obtained from entrotech, inc. (Columbus, OH) and commercially available under the trade designation, EF 947A. The color layer was obtained from entrotech, inc. (Columbus, OH) and commercially available under the trade designation, EF 1369. The extruded polyurethane layer was a polycaprolactone-based polyurethane film extruded from material obtained from Schweitzer-Mauduit International, Inc. (Greenfield, MA) under the trade designation, Argo-Guard® 49510. The topcoat layer was an acrylic topcoat prepared from a composition comprising a mixture of about 50% by weight isocyanate (available separately from entrochem, inc. (Columbus, OH), under the trade designation, ECA-426) and about 50% by weight acrylic polyol (available separately from entrochem, inc. (Columbus, OH) and commercially available under the trade designation, ECA-671).

Figure 3:
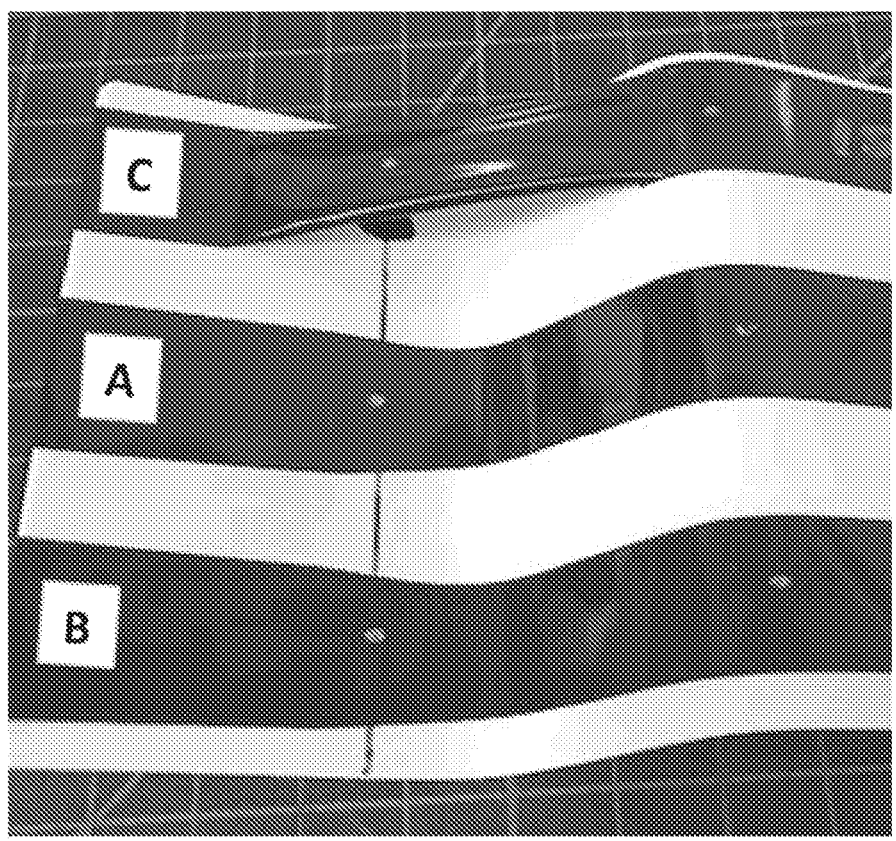
FIG. 3 is a black-and-white photograph showing samples of Comparative Example C and Examples A-B after testing at 80° C. according to the Bent Panel Stretch Test Method described herein.

A sample of the same was tested according to each of the Stress-Time (Relaxation) Test Method, Stress-Strain Test Method, and Bent Panel Stretch Test Method described herein. Data associated with testing of Comparative Example C is illustrated in FIGS. 1-2 as data curve "C." When tested at room temperature according to the Bent Panel Stretch Test Method, the sample passed. As illustrated in FIG. 3 (the top sample marked as "C"), when tested at 80° C. according to the Bent Panel Stretch Test Method, the sample failed, lifting from the test panel after only eighty minutes.

Example A

A polymeric sheet was formed to include the same adhesive layer, the same color layer, and the same topcoat layer (but having a reduced thickness of 5.1-microns) as those in Comparative Example C.

The carrier layer was 76.2-microns thick and formed using a web-polymerized process as described in Example 3 of U.S. Pat. No. 9,790,318 B2, except that Component B in Table 1 was formed from the following components, percentages of which are based on total weight of Component B: 55% of polyester diol having a molecular weight of 400 grams/mole and sold under the trade designation, CAPA 2043 (Ingevity—North Charleston, SC) and 45% of dicyclohexylmethane diisocyanate-terminated polyether prepolymer sold under the trade designation, BAYTEC WP-260 (Covestro LLC—Pittsburgh, PA). As compared to the carrier layer of Comparative Example C, the carrier layer of Example A was a softer, more conformable polyurethane layer.

A sample of the same was tested according to each of the Stress-Time (Relaxation) Test Method, Stress-Strain Test Method, and Bent Panel Stretch Test Method described herein. Data associated with testing of Example A is illustrated in FIGS. 1-2 as data curve "A." When tested at room temperature according to the Bent Panel Stretch Test Method, the sample passed. When tested at room temperature according to the Bent Panel Stretch Test Method, the sample also passed. As illustrated in FIG. 3 (the middle sample marked as "A"), when tested at 80° C. according to the Bent Panel Stretch Test Method, the sample passed.

Example B

A polymeric sheet was formed to include the same adhesive layer and the same color layer as those in Comparative Example C.

The carrier layer was 76.2-microns thick and formed using a web-polymerized process as described in Example 3 of U.S. Pat. No. 9,790,318 B2, except that Component B in Table 1 was formed from the following components, percentages of which are based on total weight of Component B: 50.2% of polyester diol having a molecular weight of 400 grams/mole and sold under the trade designation, CAPA 2043 (Ingevity—North Charleston, SC); 6.4% of a polyester triol having a molecular weight of 900 grams/mole and sold under the trade designation, CAPA 3091 (Ingevity—North Charleston, SC); and 43.5% of dicyclohexylmethane diisocyanate-terminated polyether prepolymer sold under the trade designation, BAYTEC WP-260 (Covestro LLC—Pittsburgh, PA).

The topcoat layer was a 5.1-micron thick, acrylic topcoat prepared from a composition comprising a mixture of about 50% by weight isocyanate (available separately from entrochem, inc. (Columbus, OH) under the trade designation, ECA-426) and about 50% by weight acrylic polyol (available separately from entrochem, inc. (Columbus, OH) under the trade designation, ECA-766).

Each of the carrier layer and the topcoat layer in Example B had a lower stiffness than those layers within Comparative Example C. As compared to the carrier layer of Comparative Example C, the carrier layer of Example B is a softer, more conformable polyurethane layer. As compared to the topcoat layer of Comparative Example C, the topcoat layer of Example B has a higher elongation at break.

A sample of the same was tested according to each of the Stress-Time (Relaxation) Test Method, Stress-Strain Test Method, and Bent Panel Stretch Test Method described herein. Data associated with testing of Example B is illustrated in FIGS. 1-2 as data curve "B." When tested at room temperature according to the Bent Panel Stretch Test Method, the sample passed. When tested at room temperature according to the Bent Panel Stretch Test Method, the sample passed. As illustrated in FIG. 3 (the lower sample marked as "B"), when tested at 80° C. according to the Bent Panel Stretch Test Method, the sample passed.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited unless expressly stated otherwise. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

The invention claimed is:

1. A polymeric sheet comprising sequential layers as follows:
   a topcoat layer;
   a polyurethane-based carrier layer, wherein essentially no chain extender having a molecular weight of 350 grams/mole or less is used in formation of the polyurethane-based carrier layer, and wherein each polyol used in formation of the polyurethane-based carrier layer has a molecular weight between about 350 grams/mole and about 1,000 grams/mole; and
an adhesive layer.

2. The polymeric sheet of claim 1, wherein the adhesive layer comprises a pressure-sensitive adhesive.

3. The polymeric sheet of claim 1, further comprising a release film on an exterior surface of the adhesive layer.

4. The polymeric sheet of claim 1, further comprising a carrier film on an exterior surface of the topcoat layer.

5. The polymeric sheet of claim 1, wherein the carrier layer is in-situ polymerized.

6. The polymeric sheet of claim 1, wherein essentially no butane diol is used in formation of the polyurethane-based carrier layer.

7. The polymeric sheet of claim 1, wherein essentially no polyols having a molecular weight of 1,000 grams/mole or greater are used in formation of the polyurethane-based carrier layer.

8. The polymeric sheet of claim 1, wherein each polyol used in formation of the polyurethane-based carrier layer has a molecular weight between about 350 grams/mole and about 450 grams/mole.

9. The polymeric sheet of claim 1, wherein the only polyol used in formation of the polyurethane-based carrier layer is a polyester diol.

10. The polymeric sheet of claim 1, wherein less than about 10% by weight, based on total weight of polyol components, of polyols having more than two hydroxyl moieties are used in formation of the polyurethane-based carrier layer.

11. The polymeric sheet of claim 1, wherein the polymeric sheet comprises paint in film form.

12. The polymeric sheet of claim 1, wherein the polymeric sheet comprises paint protection film.

13. An article comprising at least one surface having on at least a portion thereof the polymeric sheet of claim 1.

14. The article of claim 13, wherein the article comprises a motorized vehicle.

15. The article of claim 13, wherein the surface having on at least a portion thereof the polymeric sheet is concave.

16. A method of using the polymeric sheet of claim 1 to cover at least a concave portion of a surface on a motorized vehicle, the method comprising:
   providing the polymeric sheet of claim 1; and
   applying the polymeric sheet to at least the concave portion of the surface of the motorized vehicle.

17. The method of claim 16, wherein the polymeric sheet is heated and stretched to conform to the surface of the motorized vehicle.

18. A method of forming the polymeric sheet of claim 1, the method comprising a step of in-situ polymerizing the polyurethane-based carrier layer.

* * * * *